United States Patent
Han et al.

(10) Patent No.: US 10,142,033 B2
(45) Date of Patent: Nov. 27, 2018

(54) COMMUNICATION APPARATUS AND COMMUNICATION METHOD FOR SUCCESSIVE QUANTUM KEY DISTRIBUTION

(71) Applicant: Korea Institute of Science and Technology, Seoul (KR)

(72) Inventors: Sang Wook Han, Seoul (KR); Sung Wook Moon, Seoul (KR); Yong Su Kim, Seoul (KR); Min Ki Woo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/357,424

(22) Filed: Nov. 21, 2016

(65) Prior Publication Data

US 2017/0155499 A1    Jun. 1, 2017

(30) Foreign Application Priority Data

Nov. 27, 2015 (KR) .......................... 10-2015-0167910
Nov. 10, 2016 (KR) .......................... 10-2016-0149439

(51) Int. Cl.
*H04B 10/70* (2013.01)
*H04B 10/85* (2013.01)
(Continued)

(52) U.S. Cl.
CPC ............. *H04B 10/70* (2013.01); *H04B 10/85* (2013.01); *H04L 7/0075* (2013.01); *H04L 9/0852* (2013.01); *H04L 9/0858* (2013.01)

(58) Field of Classification Search
CPC ... H04L 7/0075; H04L 9/0852–9/0858; H04B 10/0705; H04B 10/30; H04B 10/70;
(Continued)

(56) References Cited

U.S. PATENT DOCUMENTS

2006/0045527 A1* 3/2006 Maeda ................... H04B 10/70
                                                                398/79
2006/0222180 A1* 10/2006 Elliott .................. H04L 9/0852
                                                                380/263
(Continued)

FOREIGN PATENT DOCUMENTS

JP      2003037559 A  *  2/2003
KR      10-0759811 B1     9/2007

OTHER PUBLICATIONS

Yin et al, Experimental Decoy Quantum Key Distribution up to 130KM Fiber (published in Chinese Physical Letters, vol. 25, No. 10, 2008).*

(Continued)

*Primary Examiner* — Casey Kretzer
(74) *Attorney, Agent, or Firm* — NSIP Law

(57) ABSTRACT

Disclosed is a communication apparatus including a synchronization signal detector configured to detect a synchronization signal received from other communication apparatus coupled to the communication apparatus, wherein the other communication apparatus sends a quantum signal generated by a first light source to the communication apparatus, and a second light source configured to generate a decoy signal to be added to a quantum signal that is to be sent to the other communication apparatus according to a result of the detection of the synchronization signal.

17 Claims, 6 Drawing Sheets

(51) Int. Cl.
*H04L 9/08* (2006.01)
*H04L 7/00* (2006.01)

(58) Field of Classification Search
CPC .................... H04B 10/80; H04B 10/90; H04K 1/02–1/025
See application file for complete search history.

(56) References Cited

U.S. PATENT DOCUMENTS

| | | | | |
|---|---|---|---|---|
| 2007/0058810 A1* | 3/2007 | Tanaka | .................. | H04L 9/0852 380/210 |
| 2007/0064945 A1* | 3/2007 | Yuan | .................... | H04L 9/0858 380/263 |
| 2007/0071244 A1* | 3/2007 | LaGasse | ............... | H04L 9/0858 380/278 |
| 2007/0110454 A1* | 5/2007 | Maeda | ................. | H04B 10/548 398/188 |
| 2010/0098420 A1* | 4/2010 | Ibragimov | ......... | H04B 10/0775 398/65 |
| 2016/0234018 A1* | 8/2016 | Frohlich | ................ | H04B 10/70 |

OTHER PUBLICATIONS

Chen et al, Decoy state quantum key distribution in telecom dark fiber (published at Photonics Asia 2007).*

Yang et al, Experimental demonstration of passive decoy state quantum key distribution (published in 2012 Chinese Phys. B, vol. 21, No. 10, 2012).*

Zhao, Yi, et al. "Design of Synchronous "Plug & Play" QKD-WDM-PON for Efficient Quantum Communications." CLEO: 2011 Conference on IEEE, May 1-6, 2011. (2 pages in English).

Woo et al., "Countermeasure of Trojan Horse Attach in Plug and Play QKD System." Final Program of the Optical Society of Korea Summer Meeting 2015, Optical Society of Korea. (6 pages in Korean).

Zhao, Yi et al., "Experimental Quantum Key Distribution With Decoy States", *Physical review letters*, 2006 (5 pages in English).

Korean Office Action dated May 30, 2018 in corresponding Korean Patent Application No. 10-2016-0149439 (1 pages in English and 5 pages in Korean).

* cited by examiner

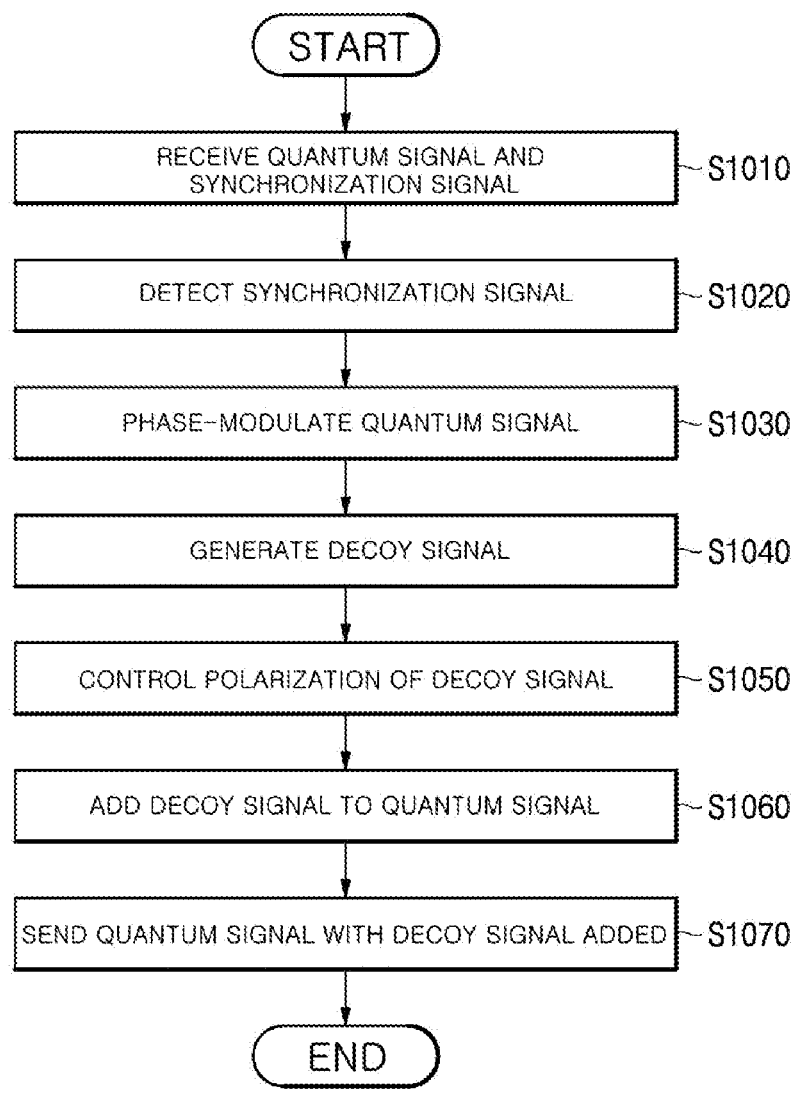

COMMUNICATION APPARATUS AND COMMUNICATION METHOD FOR SUCCESSIVE QUANTUM KEY DISTRIBUTION

CROSS-REFERENCE TO RELATED APPLICATION

This application claims priority to and the benefit of Korean Patent Application No. 10-2015-0167910, filed on Nov. 27, 2015 and Korean Patent Application No. 10-2016-0149439, filed on Nov. 10, 2016, the disclosure of which is incorporated herein by reference in its entirety.

BACKGROUND

1. Field of the Invention

The present invention relates to quantum cryptography, and more particularly, to a communication apparatus and communication method for successive quantum key distribution (QKD) in a "plug & play" key distribution system.

2. Discussion of Related Art

A quantum key distribution (QKD) system is a system in which two communication apparatuses, that is, a transmitter (Alice) and a receiver (Bob), distribute quantum keys using photons as a communication medium. In a QKD system, when an eavesdropper (Eve) tries to eavesdrop (e.g., by tapping photons in transit), it is impossible to return photons that have been observed to their quantum states before the observation according to Heisenberg's uncertainty principle. Thus, there is a change in a statistical value of received data detected by a receiver. Accordingly, the receiver may detect the presence or absence of eavesdropping by detecting the change.

Recently, a "plug & play" QKD system is being frequently used because the system can automatically compensate for polarization drift in a transmission process. Such a "plug & play" QKD system (hereinafter referred to as a P&P QKD system) is characterized in that a two-way system is employed in which a receiver transmits two photon pulses that are orthogonally polarized and temporally separated to a transmitter and the transmitter mirrors the propagation of light, rotates the polarization by 90 degrees, phase-modulates any one of the two photon pulses that are temporally separated, and returns the phase-modulated pulse to the receiver.

In this case, when a quantum signal transmitted to the transmitter has a high light intensity, a signal extracted from a photodetector has a high magnitude. Accordingly, the transmitter can easily acquire timing information for phase-modulating a quantum signal from the quantum signal through the photodetector, and can more easily monitor a Trojan horse attack of an eavesdropper. However, it is difficult to miniaturize the transmitter and it is also difficult for the P&P QKD to perform successive operation because the transmitter should include an optical attenuator for reducing the light intensity of a quantum signal to a single-photon level and a storage line (a delay line) for removing noise light generated due to the high light intensity.

On the other hand, when a quantum signal transmitted to the transmitter has a low light intensity (e.g., in a case in which a quantum signal has a light intensity of a single-photon level), the transmitter does not need to include an optical attenuator and a storage line. Accordingly, the transmitter can be miniaturized, and the P&P QKD system can perform successive operation. However, it is difficult or impossible to acquire timing information using the photodetector, and thus it is also difficult to monitor a Trojan horse attack of an eavesdropper because the signal extracted from the photodetector has a low magnitude due to the low light intensity.

As described above, it is very important to determine a level of light intensity of a photon signal (hereinafter also referred to as a "quantum signal") transmitted from a receiver to a transmitter in a P&P QKD system in association with performance, security, and size of the P&P QKD system.

SUMMARY OF THE INVENTION

The present invention is directed to providing a communication apparatus of a P&P QKD system configured to successively distribute quantum keys by maintaining a light intensity of a quantum signal transmitted to a transmitter from a receiver at low level.

The present invention is also directed to providing a new type of communication apparatus of a P&P QKD system that may maintain performance and security of the system while maintaining a light intensity of a quantum signal at a low level.

According to an aspect of the present invention, there is provided a communication apparatus including a synchronization signal detector configured to detect a synchronization signal received from other communication apparatus coupled to the communication apparatus, wherein the other communication apparatus sends a quantum signal generated by a first light source to the communication apparatus; and a second light source configured to generate a decoy signal to be added to a quantum signal that is to be sent to the other communication apparatus according to a result of a detection of the synchronization signal.

The synchronization signal may correspond to a signal having a different wavelength from the quantum signal, a GPS signal, or a network standard time.

When the synchronization signal is the signal having a different wavelength from the quantum signal, the synchronization signal detector may include a wavelength division multiplexer configured to separate the quantum signal and the synchronization signal; and a photodetector configured to detect the synchronization signal separated by the wavelength division multiplexer.

The synchronization signal may have a higher light intensity than the quantum signal.

When the synchronization signal is a GPS signal or a network signal, the synchronization signal detector may include a time synchronization device configured to detect the GPS signal or the network signal.

The communication apparatus may further include a phase modulator configured to receive a result of the detection of the synchronization signal and phase-modulate the quantum signal according to the detection result of the synchronization signal.

The communication apparatus may further include a polarization controller configured to control polarization of the decoy signal generated by the second light source.

The polarization controller may set the polarization of the decoy signal to be equal to polarization of the quantum signal or in a random manner.

The communication apparatus may further include a Faraday mirror configured to generate a noise component orthogonal to quantum signal generated by the first light source, wherein the noise component is sent to the other communication apparatus together with the decoy signal.

The communication apparatus may further include a processing unit configured to add the decoy signal generated by the second light source to at least a portion of the quantum signal to be sent to the other communication apparatus based on the detection result of the synchronization signal.

The quantum signal sent to the other communication apparatus may has a light intensity corresponding to a single-photon level of light intensity.

According to another aspect of the present invention, there is provided a communication method performed by a communication apparatus including receiving, from other communication apparatus coupled to the communication apparatus, a synchronization signal and a quantum signal generated by a first light source of the other communication apparatus; detecting the synchronization signal received from the other communication apparatus; and generating, by a second light source, a decoy signal to be added to a quantum signal that is to be sent to the other communication apparatus according to a result of a detection of the synchronization signal.

When the synchronization signal is a signal having a different wavelength from the quantum signal, the detecting of the synchronization signal may include separating the received quantum signal and synchronization signal from each other; and detecting the separated synchronization signal.

The detecting of the synchronization signal may include, when the synchronization signal is a GPS signal or a network signal, detecting the GPS signal or the network signal through a time synchronization device.

The communication method may further include, after the detecting of the synchronization signal, phase-modulating the quantum signal according to the detection result of the synchronization signal.

The generating of a decoy signal may include selecting polarization of the generated decoy signal, and the polarization of the decoy signal may be set to be equal to that of the quantum signal or in a random manner.

The generating of a decoy signal may include generating a noise component orthogonal to the quantum signal, and the noise component may be sent to the other communication apparatus together with the decoy signal.

The communication method may further include adding the generated decoy signal to at least a portion of the quantum signal to be sent to the other communication apparatus based on the detection result of the synchronization signal.

According to another aspect of the present invention, there is provided a communication system including a communication apparatus; and other communication apparatus coupled to the communication apparatus, wherein the communication apparatus is configured to receive a quantum signal and a synchronization signal from the other communication apparatus, detect the synchronization signal, and generate, by a second light source, a decoy signal to be added to a quantum signal to be sent to the other communication apparatus; and the other communication apparatus is configured to generate, by a first light source, a quantum signal and send the quantum signal and a synchronization signal to the communication apparatus.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 10 is a flowchart showing a communication method performed by a communication apparatus of a communication system according an embodiment of the present invention.

DETAILED DESCRIPTION OF EXEMPLARY EMBODIMENTS

Figure 1:
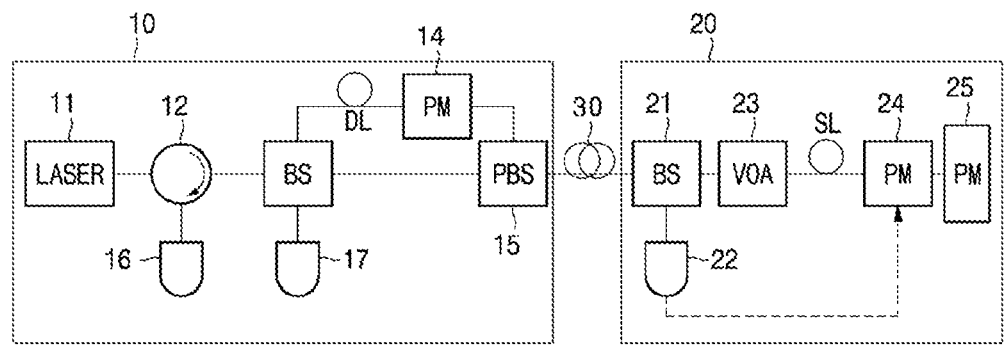
FIG. 1 is a block diagram showing a conventional communication system.

Advantages and features of the present invention, and implementation methods thereof will be clarified through following embodiments described with reference to the accompanying drawings. The present invention may, however, be embodied in different forms and is not to be construed as limited to the embodiments set forth herein. Rather, these embodiments are provided so that this disclosure is thorough, complete, and fully conveys the scope of the present invention to those skilled in the art. Like reference numerals refer to like elements throughout. As used herein, the term "and/or," includes any and all combinations of one or more of the associated listed items.

It should be understood that, although the terms first, second, etc. may be used herein to describe various elements, components, and/or sections, these elements, components, and/or sections are not limited by these terms. These terms are used only to distinguish one element, component, or section from another element, component, or section. Thus, a first element, component, or section described below could be termed a second element, component, or section without departing from the teachings of example embodiments.

In addition, reference numerals of steps (e.g., a, b, c, etc.) are used for convenience of description and are used to describe an order of the steps. Accordingly, the steps may be performed in a different order from that described herein unless clearly indicating otherwise by context. That is, respective steps may be performed in the same sequence as the described sequence, at substantially the same time, or in an opposite sequence to the described sequence.

The terminology used herein is for the purpose of describing particular embodiments only and is not intended to be limiting of the invention. As used herein, the singular forms "a," "an," and "the" are intended to include the plural forms as well unless clearly indicated otherwise by context. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

In the following description, when the detailed description of relevant known functions or configurations is determined to unnecessarily obscure the essence of the present invention, the detailed description thereof will be omitted. Also, terms used herein are defined in consideration of the functions of embodiments of the present invention and may be changed depending on a user, the intent of an operator, or a custom. Accordingly, the terms must be defined based on the following overall description of this specification.

FIG. 1 is a block diagram showing a conventional communication system.

Referring to FIG. 1, a communication system includes a first communication apparatus 10, which is a receiver (also referred to as Bob), and a second communication apparatus 20, which is a transmitter (also referred to as Alice). A communication system that will be described below corresponds to a "play & plug" quantum key distribution (P&P QKD) system.

The communication system of FIG. 1 is characterized in that the first communication apparatus 10 transmits a photon signal (hereinafter referred to as a "quantum signal") having a high light intensity to the second communication apparatus 20. Because the first communication apparatus 10 transmits the quantum signal having a high light intensity to the second communication apparatus 20, the second communication apparatus 20 may acquire timing information for phase-modulating the quantum signal from the quantum signal itself using a photodetector 22. However, because the first communication apparatus 10 transmits the quantum signal having a high light intensity to the second communication apparatus 20, the second communication apparatus 20 should include a storage line (SL) for removing noise light generated due to the quantum signal having the high light intensity, and also include a variable optical attenuator (VOA) 23 for reducing the light intensity of the quantum signal to a single-photon level. Accordingly, the communication system of FIG. 1 has difficulty in miniaturizing the second communication apparatus 20 and performing successive operation.

A process in which the communication system distributes quantum keys will be described below with reference to FIG. 1.

The first communication apparatus 10 generates a photon pulse having arbitrary polarization using a first light source 11. The generated photon pulse P is delivered to a beam splitter (BS) 13 through an optical circulator 12 and is divided into two photon pulses P1 and P2 by the beam splitter 13. One of the two photon pulses, that is, the photo pulse P1, travels through a polarization beam splitter (PBS) 15 along a short path, and the other photon pulse P2 travels through a phase modulator (PM) 14 along a long path. In this way, the generated pair of photon pulses P1 and P2 that are temporally separated and orthogonally polarized are transmitted to the second communication apparatus 20 through a quantum channel 30.

Next, the second communication apparatus 20 temporally separates the noise and the quantum signal through the SL to remove the noise light generated due to the quantum signal having the high light intensity. Also, the second communication apparatus 20 reflects the received photon pulses P1 and P2 through a Faraday mirror (FM) 25 to mirror propagation directions of the photon pulses and rotate the polarization by 90 degrees. Subsequently, the second communication apparatus 20 attenuates light intensities of the photon pulses P1 and P2 using the variable optical attenuator 23, phase-modulates one of the photon pulses (e.g., P2) using a phase modulator 24, and then sends the photon pulses back through the quantum channel 30. In this case, the photodetector 22 of the second communication apparatus 20 detects photon pulses obtained by division through a beam splitter 21 and provides a result of the detection to the phase modulator 24 as a timing signal. The phase modulator 24 phase-modulates the photon pulse P2 at a time at which the photon pulse P2 travels through the phase modulator 24 to generate a phase-modulated photon pulse P2' on the basis of the provided timing signal.

Next, the first communication apparatus 10 receives the photon pulses P1 and P2' from the second communication apparatus 20. The received photo pulses P1 and P2' travel along paths different from those traveled on during transmission because the received photon pulses P1 and P2' have respective polarizations thereof rotated 90 degrees from the polarizations of the photon pulses P1 and P2 during transmission. That is, the photon pulse P1 travels along the long path, and the photon pulse P2' travels along the short path. In this case, the phase modulator 14 phase-modulates the photon pulse P1 at a time at which the photon pulse P1 travels through the phase modulator 14 to generate a phase-modulated photon pulse P1'. Subsequently, the photon pulse P1' that is phase-modulated by the first communication apparatus 10 and the photo pulse P2' that is phase-modulated by the second communication apparatus 20 interfere with each other, and a result of the interference is detected by a plurality of single-photon detectors 16 and 17.

Subsequently, the system may enable a quantum key to be shared between the first communication apparatus 10 and the second communication apparatus 20 by performing a predefined key distribution protocol (e.g., Bennett Brassard 84 (BB84)) on the basis of the detection result of the single-photon detectors.

As described above, because the communication system of FIG. 1 uses a photon pulse having a high light intensity, the communication system has difficulty in miniaturizing the second communication apparatus 20 and the P&P QKD system has difficulty in performing successive operation.

Figure 2:
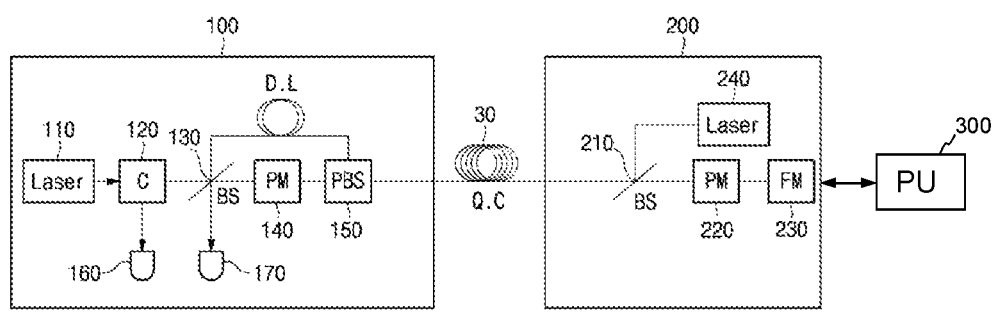
FIG. 2 is a block diagram showing a communication system according to an example embodiment of the present invention.

FIG. 2 is a block diagram showing a communication system according to an example embodiment of the present invention.

Referring to FIG. 2, a first communication apparatus 100 in a communication system of FIG. 2 has substantially the same configuration as the first communication apparatus 10 of FIG. 1, that is, the first communication apparatus 100 includes a first light source 110, an optical circulator 120, a beam splitter 130, a phase modulator 140, a polarization beam modulator 150, and single-photon detectors 160 and 170, and thus detailed descriptions of parts that are the same or similar to those described in FIG. 1 will be omitted.

Unlike the communication system of FIG. 1, the communication system of FIG. 2 is characterized in that the first communication apparatus 100 transmits a quantum signal having a low light intensity to the second communication apparatus 200. Here, the low light intensity of the quantum signal is a single-photon level of light intensity when the quantum signal that was transmitted from the first communication apparatus 100 to the second communication apparatus 200 is transmitted back to the first communication apparatus 100 from the second communication apparatus 200. Because the first communication apparatus 100 transmits the quantum signal having a low light intensity to the second communication apparatus 200, the second communication apparatus 200 does not need to include a storage line for removing noise light and an optical attenuator for reducing the light intensity of the quantum signal to a single-photon level. Alternatively, the optical attenuator may be optionally included. Accordingly, the communication system of FIG. 2 can miniaturize the second communication apparatus 200 and perform successive operation.

However, because the first communication apparatus 100 transmits a quantum signal having a low light intensity to the second communication apparatus 200, the second communication apparatus 200 cannot acquire timing information for phase-modulating the quantum signal from the quantum signal itself using a photon detector. Accordingly, the communication system according to an embodiment of the present invention may use a synchronization signal to acquire the timing information for phase-modulating the quantum signal. Implementation of an available synchronization signal and a communication apparatus using a synchronization signal will be described in detail below with reference to FIGS. 3 and 4.

A process in which the communication system distributes quantum keys will be described below with reference to FIG. 2.

In the communication system of FIG. 2, the first communication apparatus 100 also sends a synchronization signal distinct from the quantum signal to the second communication apparatus 200, and the second communication apparatus 200 detects the synchronization signal through a synchronization signal detector (not shown in FIG. 2) and acquires timing information for phase-modulating the quantum signal from the detected synchronization signal. Here, the synchronization signal detector may be implemented differently depending on the type of synchronization signal.

Referring to FIG. 2, like the communication system of FIG. 1, the communication system includes the first communication apparatus 100, which is a receiver (Bob), and the second communication apparatus 200, which is a transmitter (Alice). In this case, the communication system may include a plurality of second communication apparatuses 200.

First, like the first communication apparatus 10 of FIG. 1, the first communication apparatus 100 may generate photon pulses, generate a pair of photon pulses that are temporally separated and orthogonally polarized from the photon pulses, and transmit the generated pair of photon pulses P1 and P2 to the second communication apparatus 200 as a quantum signal.

In this case, unlike the first communication apparatus 10 of FIG. 1, the first communication apparatus 100 may generate a quantum signal having a low light intensity (e.g., a light intensity during transmission of the quantum signal from the second communication apparatus 200 to the first communication apparatus 100 corresponding to a single-photon level of light intensity) and transmit the generated quantum signal to the second communication apparatus 200. Here, the quantum signal includes a photon pulse pair sequence composed of a pair of photon pulses that are temporally separated and orthogonally polarized. Unlike the first communication apparatus 10 of FIG. 1, the first communication apparatus 100 transmits a quantum signal having a low light intensity to the second communication apparatus 200. Accordingly, unlike the second communication apparatus 20 of FIG. 1, the second communication apparatus 200 does not need to include a storage line for removing noise light and an optical attenuator for attenuating the light intensity.

Unlike the first communication apparatus 10 of FIG. 1, the first communication apparatus 100 may transmit a synchronization signal to the second communication apparatus 200. Here, the synchronization signal refers to a signal for providing timing information for phase-modulating the quantum signal to the second communication apparatus 200. In an embodiment, the first communication apparatus 100 may transmit the quantum signal and the synchronization signal together through the same transfer channel (e.g., a quantum channel 30). In another embodiment, the first communication apparatus 100 may transmit the quantum signal through a first channel (e.g., a quantum channel) and may transmit the synchronization signal through a second channel (e.g., a data channel) different from the first channel.

Next, like the second communication apparatus 20 of FIG. 1, the second communication apparatus 200 may change a propagation path of the received quantum signal, rotate polarization of the quantum signal by 90 degrees, phase-modulate the quantum signal, and then send the phase-modulated quantum signal back to the first communication apparatus 100.

Meanwhile, unlike the second communication apparatus 20 of FIG. 1, the second communication apparatus 200 receives both of the quantum signal and the synchronization signal from the first communication apparatus 100 and thus includes a synchronization signal detector (not shown in FIG. 2) for detecting the synchronization signal. Here, the synchronization signal detector may be implemented to have a different configuration according to the type of synchronization signal. This will be described in detail below with reference to FIGS. 3 and 4.

When the second communication apparatus 200 detects the synchronization signal through the synchronization signal, the phase modulator 220 may phase-modulate the quantum signal using a result of the detection of the synchronization signal as timing information. For example, the phase modulator 220 may use the result of the detection of the synchronization signal to phase-modulate the photon pulse P2 at a time at which the photon pulse P2 travels through the phase modulator 220.

Next, the second communication apparatus 200 generates a decoy signal (hereinafter, referred to as an active decoy) through a second light source 240, adds the active decoy to at least a portion of the phase-modulated quantum signal through a processing unit 300, and then sends the active decoy-added quantum signal with the added active decoy to the first communication apparatus 100. In this case, the active decoy may have substantially the same intensity as the quantum signal. Because the light intensity of the quantum signal received by the second communication apparatus 200 in the communication system of FIG. 2 is low, it is difficult for the second communication apparatus 200 to monitor a Trojan horse attack of an eavesdropper (Eve) through the intensity of input light. Accordingly, the communication system according to an embodiment of the present invention adds an active decoy generated by the second light source 240 of the second communication apparatus 200 to a quantum signal in order to use the quantum signal having the low light intensity and also easily monitor hacking of an eavesdropper.

In an embodiment, the second light source 240 may be connected to a beam splitter 210, and the processing unit 300 may be a main processor of the second communication apparatus 200 that controls operations of elements of the second communication apparatus 200. In another embodiment, the processing unit 300 may be a processor of a main server (or a computer) connected to the first communication apparatus 100 and the second communication apparatus 200, and may be configured to control operations of the first communication apparatus 100 and the second communication apparatus 200, perform a key distribution protocol, and monitor eavesdropping of an eavesdropper.

Figure 8:
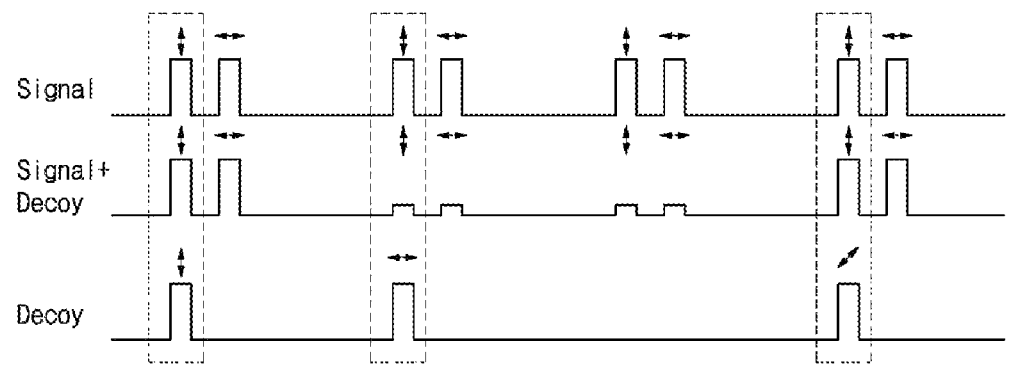
FIG. 8 is an example diagram showing a method of adding a decoy signal to a quantum signal according to an embodiment of the present invention.
Figure 9:
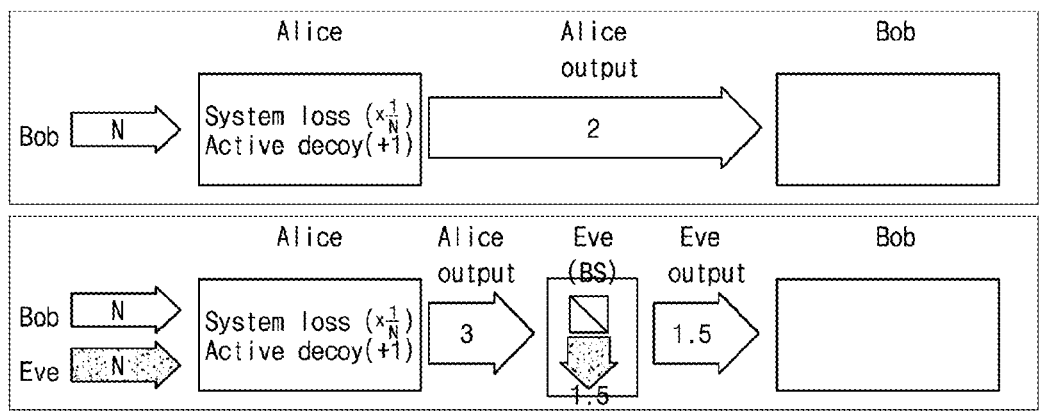
FIG. 9 is an example diagram showing a method of detecting an attack of an eavesdropper using a decoy signal according to an embodiment of the present invention.

A method of adding an active decoy to a quantum signal by a processing unit 300 and a method of monitoring a hacking attack through an addition of an active decoy will be described in detail below with reference to FIGS. 8 and 9.

As described above, a quantum signal may be composed of a sequence of a pair of photon pulses (a "photon pulse pair"). For example, as shown at the top (Signal) of FIG. 8, a quantum signal may be composed of a sequence of first to fourth photon pulse pairs. In this case, photon pulses constituting each photo pulse pair are temporally separated and orthogonally polarized as described above.

The second communication apparatus 200 may generate an active decoy using the second light source 240 and add the generated active decoy to some photon pulse pairs included in the quantum signal (e.g., three of 100 photon pulse pairs) using the processing unit 300. For example, as shown at the bottom (Decoy) of FIG. 8, the processing unit 300 may add the active decoy to the first, second, and fourth photon pulse pairs. Like this, the second communication apparatus 200 may randomly select a photon pulse pair to which the active decoy will be added and may store its associated information in a memory.

The processing unit 300 may add the active decoy to a temporally preceding or following photon pulse among photon pulses in the selected photon pulse pair. According to an embodiment, the processing unit 300 may use a result of the detection of the synchronization signal as timing information to add the active decoy to the temporally preceding or following photon pulse at a time at which the temporally preceding or following photon pulse travels through the beam splitter 210.

In this case, the processing unit 300 may consistently add an active decoy to a photon pulse at any time according to a predetermined criterion. For example, the processing unit 300 may add the active decoy only to temporarily preceding photon pulses or temporarily following photon pulses among the photon pulses in the photon pulse pairs. A quantum signal with the added active decoy is shown at the middle (Signal+Decoy) of FIG. 8.

Subsequently, the communication system may check for the presence of an eavesdropper by separately comparing only cases in which an active decoy is added to a quantum signal. For example, referring to FIG. 9, in cases where there is no eavesdropper (Eve) as shown at the top of FIG. 9, an active decoy-added quantum signal is sent from the second communication apparatus 200 to the first communication apparatus 100. In this process, because eavesdropping is not performed by an eavesdropper, the first communication apparatus 100 receives two levels of signals including a quantum signal and an active decoy. On the other hand, in cases where there is an eavesdropper (Eve) as shown at the bottom of FIG. 9, a signal caused by the eavesdropper (Eve) is added when a quantum signal is sent from the first communication apparatus 100 to the second communication apparatus 200, and thus two levels of signals are received by the second communication apparatus 200. Because the second communication apparatus 200 sends an eavesdropper (Eve) signal and the active decoy-added quantum signal, three levels of signals including all of the quantum signal, the active decoy, and the active decoy-added quantum signal are sent from the second communication apparatus 200 to the first communication apparatus 100. Because the eavesdropping is performed by the eavesdropper while the signals are sent from the second communication apparatus 200 to the first communication apparatus 100, about 1.5(=3/2) signals are dropped by the eavesdropper, and only about 1.5 signals are received by the first communication apparatus 100. That is, the presence of an eavesdropper (Eve) may be determined by adding the active decoy) to the quantum signal because a level of the signal received by the first communication apparatus 100 is different depending on the presence of the eavesdropper (Eve).

Figure 3:
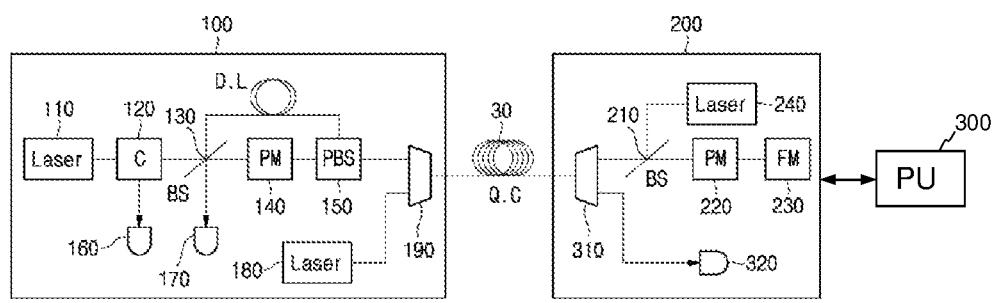
FIG. 3 is a block diagram showing a communication system according to an embodiment of the present invention.

FIG. 3 is a block diagram showing a communication system according to an embodiment of the present invention.

Referring to FIG. 3, the communication system shown in FIG. 3 is based on the communication system of FIG. 2. When the synchronization signal described in FIG. 2 and a quantum signal have different wavelengths, a synchronization signal detector may be implemented in this embodiment. The elements described in FIG. 2 will not be described in detail below.

Referring to FIG. 3, the first communication apparatus 100 may further include a third light source 180 and a wavelength division multiplexer 190, and the second communication apparatus 200 may further include a wavelength division multiplexer 310 and a photodetector 320.

For example, the first communication apparatus 100 may generate a signal having a high light intensity and a wavelength (e.g., 1540 nm) different from a wavelength (e.g., 1550 nm) of a quantum signal and also send the generated signal to the second communication apparatus 200, and the second communication apparatus 200 may receive the signal from the first communication apparatus 100 and acquire timing information for phase-modulating the quantum signal from the received signal. In this case, the light intensity of the signal may have a higher light intensity than the quantum signal.

The first communication apparatus 100 includes the wavelength division multiplexer 190 in order to send a signal generated by the third light source 180 to the second communication apparatus 200 through the quantum channel 30. In this case, the signal may be sent to the second communication apparatus 200 through a channel other than the quantum channel 30. Because the second communication apparatus 200 receives both of the quantum signal and the signal for acquiring the timing information which have different wavelengths, the second communication apparatus 200 includes the wavelength division multiplexer 310 in order to separate the signals from each other.

For example, the second communication apparatus 200 may separate the quantum signal and the signal for acquiring the timing information by wavelengths using the wavelength division multiplexer 310. The signal for acquiring the timing information may be sent to a first path connected to the photodetector 320 (e.g., Pin PD), and the quantum signal may be set to a second path connected to the phase modulator 220 and a Faraday mirror 230. The photodetector 320 may detect the signal for acquiring the timing information and send a result of the detection to the phase modulator 220. In this case, unlike the quantum signal, the signal for acquiring the timing information has a sufficiently high light intensity and may be easily detected by the photodetector 320. The phase modulator 220 may phase-modulate the quantum signal using the detection result of the photodetector 320 as timing information. For a detailed method thereof, refer to the description with reference to FIG. 2.

Figure 4:
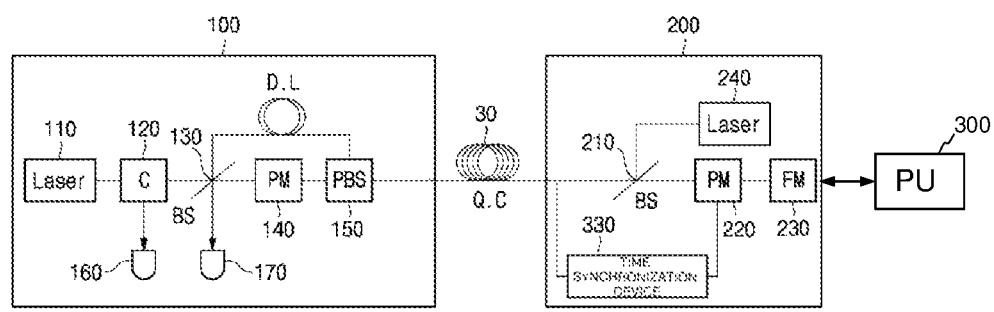
FIG. 4 is a block diagram showing a communication system according to an embodiment of the present invention.

FIG. 4 is a block diagram showing a communication system according to an embodiment of the present invention.

Referring to FIG. 4, the communication system shown in FIG. 4 is based on the communication system of FIG. 2. When the synchronization signal described in FIG. 2 is a GPS signal or a network standard time, a synchronization signal detector may be implemented in this embodiment. The elements described in FIG. 2 will not be described in detail below.

Referring to FIG. 4, the second communication apparatus 200 may further include a time synchronization device 330.

For example, the first communication apparatus 100 may send data on the GPS signal or network standard time to the second communication apparatus 200, and the second communication apparatus 200 may detect the GPS signal or network standard time through the time synchronization device 330. Also, the time synchronization device 330 may send the detected information to the phase modulator 220, and the phase modulator 220 may acquire timing information for phase-modulating the quantum signal from the detected signal. That is, the phase modulator 220 may phase-modulate the quantum signal using the detection result of the time synchronization device 330 as timing information. For a detailed method thereof, refer to the description with reference to FIG. 2.

Figure 5:
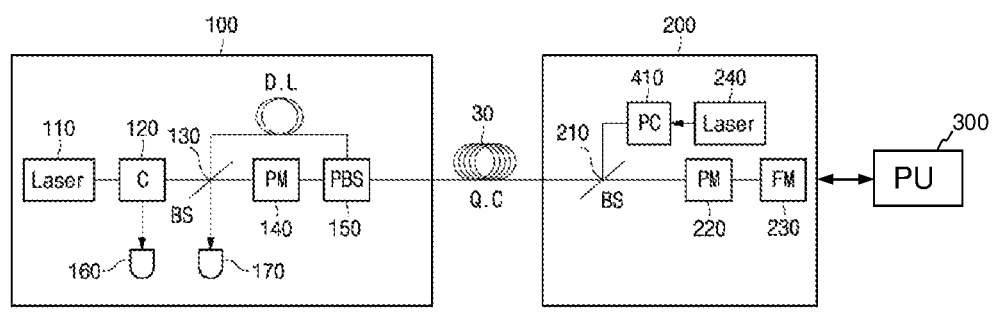
FIG. 5 is a block diagram showing a communication system according to an embodiment of the present invention.
Figure 6:
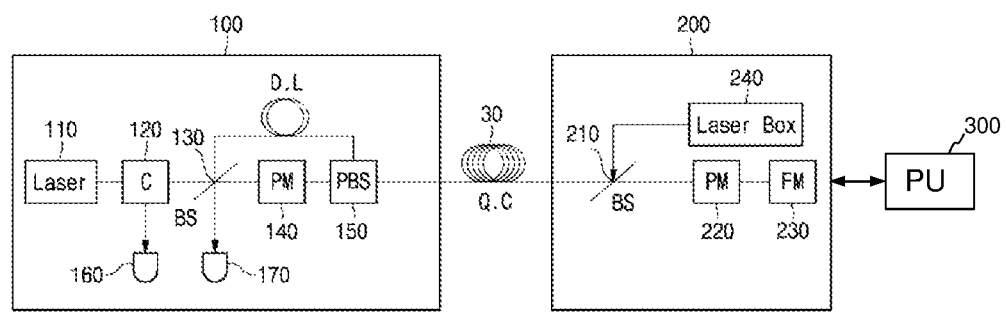
FIG. 6 is a block diagram showing a communication system according to an embodiment of the present invention.

FIGS. 5 and 6 are block diagrams each showing a communication system according to an embodiment of the present invention.

Referring to FIGS. 5 and 6, the communication systems shown in FIGS. 5 and 6 are based on the communication system of FIG. 2. In these embodiments, an element for controlling polarization of an active decoy generated by the second light source 240 is included to prevent an intercept-resend attack. The elements and methods described in FIG. 2 will not be described in detail below. Also, elements which will be described in FIGS. 5 and 6 may be applied to the communication systems of FIGS. 3 and 4 that are based on the communication system of FIG. 2.

Referring to FIG. 5, the second communication apparatus 200 may further include a polarization controller 410. Here, the polarization controller 410 may be controlled through a controller (not shown) in real time.

According to an embodiment, the second communication apparatus 200 may set polarization of an active decoy generated by the second light source 240 to be equal to polarization of the quantum signal through the polarization controller 410. This method may be applied to a case in which when a quantum signal sent from the first communication apparatus 100 is received by the second communication apparatus 200 so that polarization of the quantum signal may be accurately recognized. That is, the second communication apparatus 200 may generate an active decoy through the second light source 240, set polarization of the generated active decoy to be equal to polarization of the quantum signal through the polarization controller 410, and then insert the active decoy with the set polarization into the quantum signal through the processing unit 300.

According to another embodiment, the second communication apparatus 200 may set polarization of an active decoy generated by the second light source 240 as one of six types of polarization H, V, D, A, R, and L through the polarization controller 410. That is, the second communication apparatus 200 may generate an active decoy through the second light source 240, randomly set polarization of the generated active decoy through the polarization controller 410, and then insert the active decoy with the set polarization into the quantum signal through the processing unit 300. Also, this method may be performed through a light source box 420 shown in FIG. 6. Here, the light source box 420 includes the second light source 240 having six polarizing plates. The polarization of the active decoy may be randomly set as one of the six types of polarization H, V, D, A, R, and L through the light source box 420.

For example, when the polarization of the active decoy is set in this way, the presence of an eavesdropper, that is, the presence of an intercept-resend attack, may be determined by comparing polarization information of the active decoy stored in the second communication apparatus 200 with polarization information of an active decoy that is sent from the second communication apparatus 200 to the first communication apparatus 100 and then detected by the first communication apparatus 100.

For example, the communication system may confirm the presence of an eavesdropper by comparing a measured detection rate according to the polarization of the active decoy with respect to the quantum signal with the inserted active decoy with an expected detection rate. In detail, when the quantum signal with the inserted active decoy is sent to the first communication apparatus 100, the quantum signal may be detected through the detector 160 or the detector 170 according to the polarization information of the active decoy. That is, because a detector for detecting the signal may be determined according to the polarization information of the active decoy, statistics of the number of quantum signals detected by the detectors 160 and 170 may be predicted by using the polarization information of the active decoy stored in the second communication apparatus 200. Here, when an eavesdropper intercepts a quantum signal sent from the second communication apparatus 200 for the purpose of eavesdropping and sends another quantum signal to the first communication apparatus 100, the eavesdropper does not know the polarization information of the active decoy inserted into the quantum signal sent from the second communication apparatus 200. Accordingly, the eavesdropper sends a quantum signal having different polarization information to the first communication apparatus 100. That is, when there is an eavesdropper, a difference occurs between the number of detections of each detector that is predicted using the polarization information of the active decoy stored in the second communication apparatus 200 and the number of actual detections by each detector. Accordingly, the presence of an eavesdropper may be determined by comparing the number of actual detections by each of the detectors 160 and 170 in the first communication apparatus 100 with the number of detections of each of the detectors 160 and 170 that were predicted according to the polarization information of the active decoy stored in the second communication apparatus 200.

Figure 7:
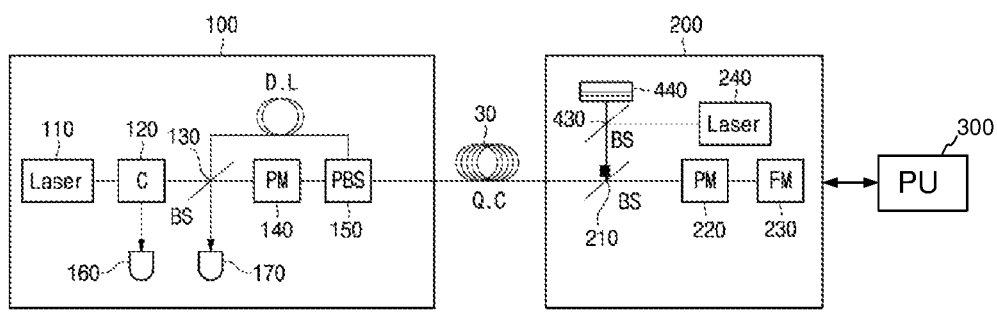
FIG. 7 is a block diagram showing a communication system according to an embodiment of the present invention.

FIG. 7 is a block diagram showing a communication system according to an embodiment of the present invention.

Referring to FIG. 7, the communication system shown in FIG. 7 is based on the communication system of FIG. 2. In this embodiment, a noise component is sent together with an active decoy generated by the second light source 240 in order to prevent an intercept-resend attack. The elements and methods described in FIG. 2 will not be described in detail below. Also, elements that will be described in FIG. 7 may be applied to the communication systems of FIGS. 3 and 4 that are based on the communication system of FIG. 2.

Referring to FIG. 7, the second communication apparatus 200 may further include a beam splitter 430 and a Faraday mirror 440. For example, in the second communication apparatus 200, quantum signals received from the first communication apparatus 100 are split at a ratio of 50:50 through the beam splitter, and among the split quantum signals, quantum signals traveling toward the Faraday mirror 440 are further split at a ratio of 1:99 through the beam splitter 430. Here, polarization of ninety-nine percent of the quantum signals split through the beam is rotated 180 degrees by the Faraday mirror 440 and sent back to the beam splitter 210 through the beam splitter 430. Also, active decoys generated by the second light source 240 are split by the beam splitter 430, and only one percent of the generated active decoys travel to the beam splitter 210. That is, quantum signals having polarization and phase rotated 90 degrees through the Faraday mirror 440 and the phase modulator 220 among the quantum signals received from the first communication apparatus 100, quantum signals (hereinafter referred to as "noise components") having polarization rotated 180 degrees through the Faraday mirror 440 among the quantum signals received from the first communication apparatus 100, and an active decoy generated by the second light source 240 reach the beam splitter 210 of the second communication apparatus 200.

For example, according to the embodiment shown in FIG. 7, a signal having the same polarization as a quantum signal received by the second communication apparatus 200 from the first communication apparatus 100 may be sent back to the first communication apparatus 100. A noise component orthogonal to the quantum signal sent from the first communication apparatus 100 is generated by the Faraday mirror 440, and an active decoy is sent to the first communication apparatus 100 together with a noise component orthogonal to the quantum signal. Accordingly, an eavesdropper cannot distinguish the active decoy. In order to successfully perform an attack, an eavesdropper should accurately know a time point at which an active decoy is used in the first communication apparatus 100 and the second communication apparatus 200, that is, a time point at which the active decoy is inserted into the quantum signal. According to the embodiment shown in FIG. 7, the noise component and the active decoy cannot be distinguished from each other, and thus an eavesdropper cannot know the time point at which the active decoy is used.

For example, according to an embodiment shown in FIG. 7, the active decoy has any polarization information when there is no noise component. Accordingly, when an eavesdropper has the same system as the first communication apparatus 100, the eavesdropper may know a time point at which the active decoy is used because of abnormal interference caused by the active decoy. That is, depending on the polarization information, a normal quantum signal sent to the second communication apparatus 200 along a long path of the first communication apparatus 100 travels through a short path when the quantum signal is sent from the second communication apparatus 200 back to the first communication apparatus 100, and a normal quantum signal sent to the second communication apparatus 200 along the short path of the first communication apparatus 100 travels through the long path when the quantum signal is sent from the second communication apparatus 200 back to the first communication apparatus 100. Accordingly, a time at which interference between the quantum signals occurs is constantly maintained. However, an active decoy having any polarization information may travel through the long path even though the signal should travel through the short path or may travel through the short path even though the signal should travel through the long path. Accordingly, abnormal interference caused by the active decoy before or after interference occurs between the normal quantum signals may be generated and then detected by the detectors 160 and 170. An eavesdropper may recognize a time point at which the active decoy is inserted on the basis of a time point at which abnormal interference caused by the active decoy is detected.

However, according to an embodiment shown in FIG. 7, a noise component orthogonal to an enhanced quantum signal is generated using the Faraday mirror 440. Accordingly, in the first communication apparatus 100, interference caused by the noise component always occurs before and after normal interference occurs, and abnormal detections always occur in the detectors 160 and 170. Accordingly, since an eavesdropper cannot distinguish between abnormal interference caused by the active decoy and abnormal interference caused by the noise component and cannot recognize a time point at which the active decoy is inserted, an attack of the eavesdropper may be prevented.

FIG. 10 is a flowchart showing a communication method performed by a communication apparatus of a communication system according an embodiment of the present invention.

In FIG. 10, detailed descriptions of parts that are the same or similar to those described in FIGS. 1 to 9 will be omitted.

Referring to FIG. 10, a second communication apparatus 200 receives a synchronization signal and a quantum signal that are generated by a first light source 110 of a first communication apparatus 100 (S1010). Here, the quantum signal includes a photon pulse pair sequence composed of a pair of photon pulses that are temporally separated and orthogonally polarized, and the synchronization signal is a signal for obtaining timing information for phase-modulation and may be variously implemented.

The second communication apparatus 200 detects the synchronization signal through a synchronization signal detector (S1020). Here, the synchronization signal detector may be implemented differently depending on the type of synchronization signal. For example, information regarding the synchronization signal detected through the synchronization signal detector may be provided to at least one of a phase modulator 220, a second light source 240, and a processing unit 300.

The second communication apparatus 200 changes a propagation direction of the quantum signal and rotates the propagation by 90 degrees using a Faraday mirror 230, and the phase modulator 220 phase-modulates the quantum signal according to the timing information for phase-modulation acquired on the basis of a result of the detection of the synchronization (S1030).

The second communication apparatus 200 generates an active decoy using the second light source 240 (S1040). In an embodiment, the active decoy may have substantially the same light intensity as the quantum signal. Also, the active decoy may be polarized through a polarization controller or may be embedded in a noise component orthogonal to the quantum signal (S1050).

The second communication apparatus 200 adds the active decoy to at least a portion of the quantum signal on the basis of the detection result of the synchronization signal (S1060). In an embodiment, the second communication apparatus 200 may add the active decoy to some pairs of photon pulses in the quantum signal on the basis of the detection result of the synchronization signal using the processing unit 300. In this case, the processing unit 300 may add the active decoy to a temporally preceding or following photon pulse among photon pulses in a selected photon pulse pair. Also, the processing unit 300 may consistently add the active decoy to a photon pulse at any timing according to a predetermined criterion.

The second communication apparatus 200 sends the phase-modulated quantum signal with the added active decoy back to the first communication apparatus 100 (S1070).

In an embodiment, the first communication apparatus 100 may receive quantum signals from the second communication apparatus 200 and detect the phase-modulated quantum signal. In more detail, the first communication apparatus 100 may receive a pair of photon pulses P1 and P2' from the second communication apparatus 200, phase-modulate the photon pulse P1 that was not phase-modulated in the photon pulse pair by using a phase modulator, and detect interference caused by the photon pulse P1' that is phase-modulated by the first communication apparatus 100 and interference caused by the photon pulse P2' that is phase-modulated by the second communication apparatus 200 using a plurality of single-photon detectors.

Next, the first communication apparatus 100 and the second communication apparatus 200 share a quantum key. In an embodiment, the first communication apparatus 100 and the second communication apparatus 200 may perform a predefined key distribution protocol (e.g., BB84) on the basis of the detection result of the single-photon detectors to share a quantum key.

The aforementioned quantum key distribution method may be implemented as an application or in the form of program instructions executable through various computer components and recorded on a computer-readable recording medium. The computer-readable recording medium may include program instructions, data files, data structures, or combinations thereof. The program instructions recorded on the computer-readable recording medium may be specifically designed for the present invention or may be well-known to and used by those skilled in the art of computer software.

As described above, according to an embodiment of the present invention, it is possible to maintain a light intensity of a quantum signal transmitted from a receiver to a transmitter at low level. Accordingly, the transmitter does not need to have an optical attenuator and a storage line, thus miniaturizing the transmitter and also enabling the P&P QKD system to perform successive operation.

It is also possible to facilitate acquisition of timing information for phase-modulating the quantum signal and monitoring a Trojan horse attack of an eavesdropper while maintaining the light intensity of the quantum signal at low level, thus achieving a high level of performance and a high level of security.

It is also possible to adjust polarization of an active decoy for monitoring a Trojan horse attack of an eavesdropper to prevent an intercept-resend attack.

Examples of the computer-readable recording medium include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as a ROM, a random access memory (RAM), or a flash memory that is specially designed to store and execute program instructions. Examples of the program instructions include not only machine code generated by a compiler or the like but also high-level language codes that may be executed by a computer using an interpreter or the like. The hardware device may be configured to operate as one or more software modules in order to perform operations of the present invention, and vice versa.

While example embodiments have been illustrated and described above, the present disclosure is not limited to the aforementioned specific embodiments. Those skilled in the art should appreciate that various modifications can be made to the embodiments without departing from the subject matter of the present invention as defined by the appended claims, and also that such modifications are not to be understood individually from the technical spirit or prospect of the present disclosure.

Also, while a product invention and a process invention have been described in this specification, the descriptions thereof may be supplemented as necessary.

What is claimed is:

1. A communication apparatus, comprising:
   a synchronization signal detector configured to detect a synchronization signal received from an other communication apparatus coupled to the communication apparatus, wherein the communication apparatus is configured to receive a first quantum signal generated by a first light source of the other communication apparatus;
   a second light source configured to generate a decoy signal to be added to a second quantum signal, generated by reflecting the first quantum signal off a reflector, that is to be sent to the other communication apparatus, in response to the first quantum signal being generated and received from the first light source of the other communication apparatus according to a result of the detecting of the synchronization signal; and
   a processor configured to add the generated decoy signal to pairs of photon pulses in the second quantum signal based on the result of the detecting of the synchronization signal, to monitor hacking of an eavesdropper in a plug and play quantum key distribution.

2. The communication apparatus of claim 1, wherein the synchronization signal corresponds to a signal comprising a different wavelength from the first quantum signal, a GPS signal, or a network standard time.

3. The communication apparatus of claim 2, wherein when the synchronization signal is the signal comprising the different wavelength from the first quantum signal, the synchronization signal detector comprises
   a wavelength division multiplexer configured to separate the first quantum signal and the synchronization signal, and
   a photodetector configured to detect the separated synchronization signal.

4. The communication apparatus of claim 3, wherein the synchronization signal comprises a higher light intensity than the first quantum signal.

5. The communication apparatus of claim 2, wherein when the synchronization signal comprises a GPS signal or a network signal, the synchronization signal detector comprises a time synchronization device configured to detect the GPS signal or the network signal.

6. The communication apparatus of claim 1, further comprising a phase modulator configured to receive a result of the detecting of the synchronization signal, and phase-modulate the second quantum signal according to the result of the detecting of the synchronization signal.

7. The communication apparatus of claim 1, further comprising a polarization controller configured to control polarization of the decoy signal.

8. The communication apparatus of claim 7, wherein the polarization controller is further configured to set the polarization of the decoy signal to be equal to polarization of the second quantum signal or in a random manner.

9. The communication apparatus of claim 1, wherein the reflector comprises a Faraday mirror configured to generate a noise component orthogonal to the first quantum signal generated by the first light source, wherein the noise component is sent to the other communication apparatus together with the decoy signal.

10. The communication apparatus of claim 1, wherein a light intensity of the second quantum signal sent to the other communication apparatus is a single-photon level of light intensity, to monitor the hacking of the eavesdropper in the plug and play quantum key distribution.

11. A communication method performed by a communication apparatus, the communication method comprising:
    receiving, from an other communication apparatus coupled to the communication apparatus, a synchronization signal and a first quantum signal generated by a first light source of the other communication apparatus;
    detecting the synchronization signal received from the other communication apparatus;
    generating, by a second light source, a decoy signal to be added to a second quantum signal, generated by reflecting the first quantum signal off a reflector, that is to be sent to the other communication apparatus in response to the first quantum signal being generated and received from the first light source of the other communication apparatus according to a result of the detecting of the synchronization signal; and
    adding the generated decoy signal to pairs of photon pulses in second the quantum signal based on the result of the detecting of the synchronization signal, to monitor hacking of an eavesdropper in a plug and play quantum key distribution.

12. The communication method of claim 11, wherein when the synchronization signal is a signal comprising a different wavelength from the first quantum signal, the detecting of the synchronization signal comprises
    separating the received first quantum signal and synchronization signal from each other, and
    detecting the separated synchronization signal.

13. The communication method of claim 11, wherein the detecting of the synchronization signal comprises, when the synchronization signal comprises a GPS signal or a network signal, detecting the GPS signal or the network signal through a time synchronization device.

14. The communication method of claim 11, further comprising, after the detecting of the synchronization signal, phase-modulating the second quantum signal according to the result of the detecting of the synchronization signal.

15. The communication method of claim 11, wherein the generating of the decoy signal comprises selecting polarization of the generated decoy signal, and the polarization of the decoy signal is set to be equal to that of the second quantum signal or in a random manner.

16. The communication method of claim 11, wherein the generating of a decoy signal comprises generating a noise component orthogonal to the first quantum signal, and the noise component is sent to the other communication apparatus together with the decoy signal.

17. A communication system, comprising:
    a communication apparatus; and
    an other communication apparatus coupled to the communication apparatus, and configured to
    generate, by a first light source, a first quantum signal, and send the first quantum signal and a synchronization signal to the communication apparatus,
    wherein the communication apparatus is configured to
    receive, from the other communication apparatus, the synchronization signal and the first quantum signal generated by the other communication apparatus,
    detect the synchronization signal received from the other communication apparatus, and
    generate, by a second light source, a decoy signal to be added to a second quantum signal, generated by reflecting the first quantum signal off a reflector, that is to be sent to the other communication apparatus according to a result of a detection of the synchronization signal, in response to the quantum signal being generated and received from the first light source of the other communication apparatus; and
    a processor configured to add the generated decoy signal to pairs of photon pulses in the second quantum signal based on the result of the detection of the synchronization signal, to monitor hacking of an eavesdropper in a plug and play quantum key distribution.

* * * * *